July 30, 1968  G. A. VIEHMANN  3,394,639

EXPANSION JOINT

Filed May 24, 1966  2 Sheets-Sheet 1

INVENTOR
GEORGE A. VIEHMANN
BY
HIS ATTORNEYS

July 30, 1968  G. A. VIEHMANN  3,394,639
EXPANSION JOINT
Filed May 24, 1966  2 Sheets-Sheet 2
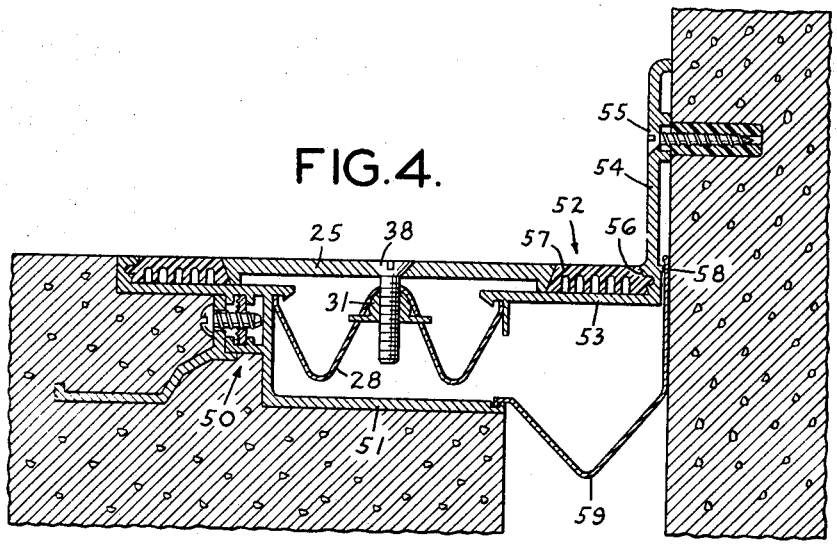
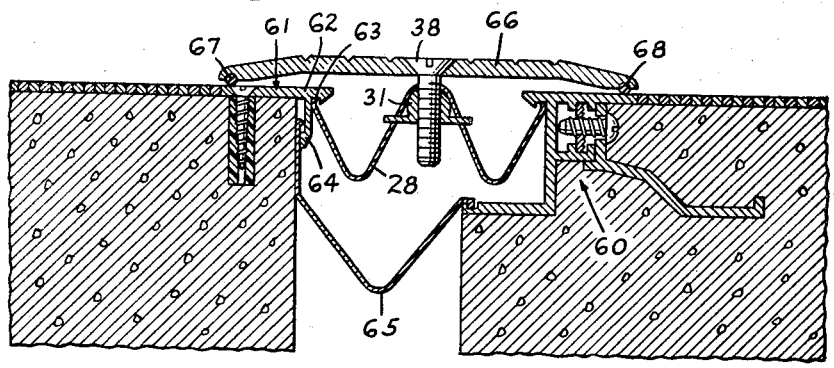
INVENTOR
GEORGE A. VIEHMANN
BY
HIS ATTORNEYS

United States Patent Office 3,394,639
Patented July 30, 1968

3,394,639
EXPANSION JOINT
George A. Viehmann, New Providence, N.J., assignor to Construction Specialties, Inc., Cranford, N.J., a corporation of New Jersey
Filed May 24, 1966, Ser. No. 552,477
3 Claims. (Cl. 94—18)

ABSTRACT OF THE DISCLOSURE

An expansion joint cover having a pair of angular base members to be fixed to structural elements on opposite sides of a joint between the elements, a cover plate slideably engaging one flange of each of the base members and spanning the joint, the cover plate being capable of movement relative to the base members upon shifting of the structural elements by virtue of a detachable connection to one or more spring members of W-shaped cross-section having their ends engaging and positioned in grooves in the base members and providing the flexibility necessary to compensate for relative and extended shifting of the structural elements.

---

This invention relates to improvements in covers for expansion joints in structures, such as floors, sidewalks, pavement, walls, ceilings and the like and more particularly to expansion joint covers which effectively cover the expansion joint during expansion and contraction of the joint and during relative shifting of the structures in the planes of the joint.

Many different types of expansion joint covers have been provided heretofore. The most common and satisfactory types are those including a cover member usually in the form of a metal extrusion, a pair of base members which are attached to the structural members such as floors, walls, ceilings and the like adjacent an expansion joint therein and flanges on the cover member and a base member which can be interlocked to enable relative sliding movement of the cover member on the other base member, thereby maintaining the joint covered despite contraction and expansion of the joint between the structural members. Such joint covers are somewhat less than satisfactory when the structural members bounding the joint shift in planes parallel to the gap or joint itself. Such shifting movement must be accompanied by tilting of the cover member and inasmuch as the cover member is usually affixed relatively rigidly to one of the base members, the shifting of the structural members either leaves a gap between the cover member and one of the base members or tends to bend and stress the cover member or the base member on which it is supported, deforming one or the other or loosening them.

In accordance with the present invention, an expansion joint cover is provided which has the needed flexibility to enable the cover member to maintain contact with the base members attached to the structural members while the joint expands or contracts and even when relative shifting movement occurs between the structural members in directions generally parallel to the joint or gap between them.

More particularly, in accordance with the present invention, the new expansion joint includes a pair of base members to be affixed to structural members bounding an expansion joint and a cover member spanning the joint and overlying the base members and which is supported by means of one or more spring devices capable of expansion, contraction, twisting and other deformation to maintain contact between the edges of the cover member and the base members during relative shifting of the structural members in any direction or directions throughout a relatively wide range of movement.

In a preferred form of the invention, a typical spring device comprises a corrugated or generally W-shaped spring having ends engaging the base members on opposite sides of the joint and having an apex portion disposed about midway of the joint provided with a connecting member which may be connected to the cover member by means of a screw or equivalent device to maintain the cover member in sliding contact with the base members as they shift relative to each other.

Due to the flexible nature of the spring device, the cover member is maintained substantially centered with respect to the base members and has a capacity for both sliding relative to them and tilting while maintaining intimate contact at its edges with the base members. In this way, a smooth gap-free joint cover without raised or projecting edges which are unsightly and, in some instances, dangerous, is provided in a form which can be readily installed and removed for inspection or servicing, as may be required.

For a better understanding of the present invention, reference may be had to the accompanying drawings, in which FIGURE 1 is a perspective and sectional view of a typical expansion joint embodying the present invention;

FIGURE 4 is a view in cross section of a modified form of cover embodying the invention for use with an expansion joint at a junction of a floor and a wall; and FIGURE 5 is a view in section of a further modification of the expansion joint embodying the present invention.

Figure 1:
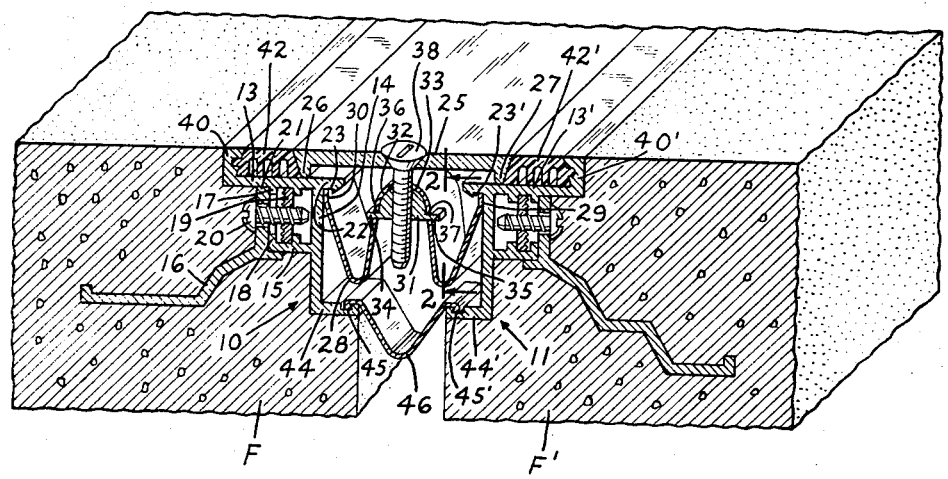
Figure 3:
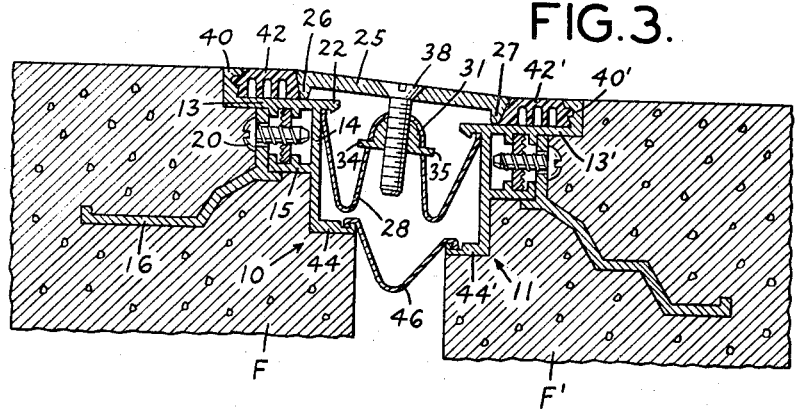
FIGURE 3 is a sectional view of the expansion joint showing the tilting movement of the cover member upon relative shifting of the structural members adjacent the expansion joint.
Figure 2:
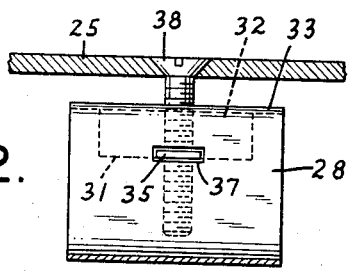
FIGURE 2 is a view in section taken on line 2—2 of FIGURE 1.

Referring to FIGURES 1 to 3 of the drawings, one illustrative embodiment of the invention includes a pair of the base members 10 and 11 of substantially identical construction such as a metal extrusion which can be cut into suitable lengths; one of the sections being turned end for end to form essentially a mirror image of the other.

The base member 10, as disclosed, includes a pair of right-angularly related plate portions 13 and 14 which are adapted to be disposed adjacent the upper corner of a floor section F or other structural members formed of concrete or the like. Extending laterally from the plate portion 14 is a flange 15 which with the under surface of the plate portion 13 forms a channel member and serves to support one or more anchor bars 16 for securing the base member 10 to the floor section F. The base member 13 and the flange 15 have inwardly extending ribs 17 and 18 which are adapted to engage a clamping plate 19 to which the anchor member or bar 16 is secured by means of a screw 20 passing through a plate portion 21 on the bar 16 with the plate 19 and the plate portion 21 gripping one of the ribs 17 and the outer edge of the flange 15. At the junction of the plate portions 13 and 14 is an inwardly extending flange 22 having a groove 23 in its under surface. As indicated above, the base member 11 is attached to the floor section F', and is also provided with a downwardly opening or facing groove 23'. Resting on top of the plate portions 13 and 13' of the base members 10 and 11 is a cover member or plate 25 having downwardly extending ribs 26 and 27 at its longitudinal edges.

In order to secure the cover plate 25 in sliding relation to the base members 10 and 11, one or more corrugated and preferably W-shaped springs 28 are mounted between the base members 10 and 11 with the outer, upper ends 29 and 30 of the springs engaging in the grooves 23 and 23'. A connector member or nut 31 which has a semi-cylindrical top portion 32 engages in the rounded apex or central corrugation 33 of the spring 28 and is retained therein by means of oppositely directed tabs 34 and 35 which are received in slots 36 and 37 in the spring. Co-operating with the member or nut 31 is a screw 38 which passes through the cover plate 25 and a hole in the apex 33 of the spring. The head of the screw 38 is countersunk in the cover plate. The spring 28 can be tensioned by adjustment of the screw 38 to retain the ends of the spring in the grooves 23 and 23' and with the cover plate in engagement with the plate portions 13 and 13'.

The plate portions 13 and 13' have upwardly extending flanges 40 and 40' at their outer edges which are slightly undercut or tapered on their inner surfaces and may be provided with lengthwise extending grooves 41 and 41' for receiving ribs on resilient elastomeric filler strips 42 and 42', formed for example, of vinyl plastic, natural or synthetic rubber or the like. The edges of the cover plate 25 may also be undercut or tapered to secure the filler strips against loss upon expansion and contraction of the building structure and variation in width of the joint therebetween. For greater resiliency, the under surfaces of the filler strips 42 and 42' may be grooved or perforated, if desired.

Due to the resiliency of the spring 28 and the filler strips 42 and 42', it will be apparent that the width of the gap or joint between the floor sections can increase or decrease while contact is maintained between the cover plate 25 and the plate portions 13 and 13' of the base members. Also as illustrated in FIGURE 3, if one of the floor sections should rise or fall, the spring 28 can deform or twist while nevertheless resiliently urging the edges of the cover plate 25 against the surfaces of the plate portions 13 and 13'. Also, the filler strips 42 and 42' will be compressed or deformed to maintain an essentially gap-free contact between them and the edges of the cover plate 25.

If leakage of water through the joint presents a problem, means is provided for preventing such leakage, including a pair of inwardly directed flanges 44 and 44' at the lower edges of the plate portion 14, these flanges being provided with undercut grooves 45, 45' for receiving the beaded edges of a resilient water stop member 46 of generally V-shaped cross section. The edges of the water stop 46 may be retained in the grooves by means of caulking strips or the like formed of plastic tubing or rod.

The expansion joint cover described above is susceptible to considerable modification not only in the means for securing the base member to the building structures but in the shape and form of the base and cover members. Thus, as shown in FIGURE 4, one of the base members 50 may be similar to the base members 10 and 11 as described above with the exception that the water stop supporting flange 51 thereof is of greater transverse width than the flanges 44 and 44'. The other base member 52 includes a horizontal plate portion 53 and an upwardly extending right angularly related plate portion 54 adapted to be secured to a wall in any suitable way, such for example, by means of a series of screws 55. At the junction of the plate portions 53 and 54 is a thickened portion having an undercut surface 56 to aid in retaining the sealing strip 57 in position and a rib 58 for clamping the edge of the water stop 59 between the wall and the base member. The action of the joint cover disclosed in FIGURE 4 is the same as the action of the joint cover disclosed in FIGURES 1 to 3.

Another form of joint cover embodying the invention is shown in FIGURE 5. In this modification, the base member 60 is the same as the base member 10 or 11, as shown in FIGURES 1 and 2. The opposing base member 61 includes a flat plate portion 62 having a spring receiving groove 63 in its undersurface and a downwardly extending flange 64 for engaging and clamping one edge of the water stop 65. In this form of the invention, a cover plate 66 is domed transversely and is provided with weatherstrips 67 and 68 at its opposite edges for engaging the base members and providing a weather-tight seal therebetween.

It will be understood that the cover members may be modified in their contours depending upon requirements. Thus, as shown in FIGURES 1 to 4, the cover member may have a smooth upper surface or it may be grooved or corrugated as shown in FIGURE 5 or provided with inserts of abrasive or anti-skid material. Moreover, the sizes of the various components of the expansion joint cover can be varied depending upon the dimensions and shapes of structural members with which they are used and they may be formed of suitable types of material, such as aluminum, bronze, or the like.

The springs 28 preferably are formed of stainless spring steel but may be formed of other spring material as may be desired. Also, the sealing strips 42, 42' weather strips, caulking strips, etc. may be formed of suitable elastomeric materials, such as vinyl plastics, synthetic or natural rubber or the like, as may be desired.

Accordingly, it will be apparent that the forms of the invention described herein are illustrative and should not be considered as limiting the scope of the invention as defined in the following claims.

I claim:

1. A cover for a joint between structural members comprising a pair of base members, means for attaching a base member to each of said structural members on opposite sides of said joint, a cover member for slideably engaging said base members and spanning said joint, a substantially W-shaped spring member spanning said joint and having opposite ends engaging said base members and an apex extending lengthwise of said joint, said spring member being resiliently expansible, contractible and flexible, grooves in said base members for receiving said ends of said spring member, an elongated threaded member mounted in and extending lengthwise of said apex of said spring member, and a connecting member engaging said elongated member and said cover member to retain said cover member in engagement with said base members, said spring member expanding, contracting and deforming in response to relative movements between said base members to enable tilting and sliding engagement of said cover member with said base members.

2. A cover for a joint between structural members comprising a pair of base members, means for attaching a base member to each of said structural members on opposite sides of said joint, a spring member engaging each of said base members and spanning said joint, said spring member being substantially W-shaped in cross-section and having opposite ends engaging said base members and an apex therebetween and being resiliently expansible, contractible and flexible, a cover member for slideably engaging said base members and spanning said joint, a first connector comprising a semi-cylindrical portion engaging in the apex of said W-shaped spring member and laterally extending flanges, said spring member having slots therein adjacent to said apex receiving said flanges to secure said first connector to said spring member, and a second connector engaging said cover member and detachably engaging said first connector to retain said cover member in engagement with said base members, said spring member expanding, contracting and deforming in response to relative movement between said base members to enable tilting and not sliding engagement of said cover member with said base members.

3. The cover set forth in claim 2 comprising flanges on said base members spaced from opposite edges of said cover member, and resilient sealing members interposed between said opposite edges of said cover member and said flanges.

References Cited
UNITED STATES PATENTS

| | | | |
|---|---|---|---|
| 2,043,571 | 6/1936 | Bargreen | 94—18 |
| 2,135,048 | 11/1938 | Giffin | 94—18 |
| 2,151,605 | 3/1939 | Lavering. | |
| 2,577,997 | 12/1951 | Carter | 94—18 XR |
| 2,976,782 | 3/1961 | Thom | 94—18 |
| 3,183,626 | 5/1965 | Schmitt. | |

JACOB L. NACKENOFF, *Primary Examiner.*